(12) United States Patent
Antony et al.

(10) Patent No.: US 12,718,530 B2
(45) Date of Patent: Aug. 25, 2026

(54) MODULAR MACHINE LEARNING SYSTEMS, DATABASES, METHODS, AND COMPUTER PROGRAM PRODUCTS FOR DEVELOPING AND DEPLOYING AUTOMATED IMAGE SEGMENTATION PROGRAMS

(71) Applicant: TRANSLATIONAL IMAGING INNOVATIONS, INC., Hickory, NC (US)

(72) Inventors: Bhavna Antony, Templestowe Lower (AU); Eric L. Buckland, Hickory, NC (US); Alexander E. Salmon, Garner, NC (US); Robert C. Williams, Durham, NC (US)

(73) Assignee: TRANSLATIONAL IMAGING INNOVATIONS, INC., Hickory, NC (US)

( * ) Notice: Subject to any disclaimer, the term of this patent is extended or adjusted under 35 U.S.C. 154(b) by 244 days.

(21) Appl. No.: 18/633,683

(22) Filed: Apr. 12, 2024

(65) Prior Publication Data

US 2024/0346807 A1 Oct. 17, 2024

Related U.S. Application Data

(60) Provisional application No. 63/495,598, filed on Apr. 12, 2023.

(51) Int. Cl.
*G06V 10/774* (2022.01)
*G06F 16/583* (2019.01)
(Continued)

(52) U.S. Cl.
CPC .......... *G06V 10/774* (2022.01); *G06F 16/583* (2019.01); *G06V 10/26* (2022.01);
(Continued)

(58) Field of Classification Search
CPC ...... G06V 10/774; G06V 10/26; G06V 10/40; G06V 20/70; G06V 10/82; G06V 2201/03; G06F 16/583
See application file for complete search history.

(56) References Cited

U.S. PATENT DOCUMENTS

| | | | |
|---|---|---|---|
| 10,235,994 | B2 | 3/2019 | Huang et al. |
| 10,762,422 | B2 | 9/2020 | Shaked et al. |

(Continued)

OTHER PUBLICATIONS

Ting et al., Artificial Intelligence, Machine Learning and Deep Learning in Ophthalmology: Current Clinical Relevance, Accepted Version for Publication, 2019, 96 pages, https://discovery.ucl.ac.uk/id/eprint/10086782/ArtificialIntelligence, Machine Learning and Deep Learning in Ophthalmology: Current Clinical Relevance Daniel S.W. Ting MD PhD1 Lily Peng MD PhD2 Avinash V Varadarajan MS2.

(Continued)

*Primary Examiner* — Santiago Garcia
(74) *Attorney, Agent, or Firm* — Stanek Lemon Crouse & Meeks, PA

(57) ABSTRACT

A system for training and deployment of automated image segmentation algorithms is provided. The system includes a database; one or more user interfaces for curating collections of images and annotating images that are stored in the database; a structured library of annotations that form a dictionary for defining features within an image; a means for training a deep learning model according to a set of annotations applied to a collection of images; a means for deploying a plurality of deep learning models from the set of applied annotations, the plurality of deep learning models including a nested set of annotations such that a first model segments a first set of features within the image and a second model segments the first set of features of the first model and at least one additional feature of the image; and a means for (Continued)

transfer learning, wherein at least one of the plurality of deep learning models deployed for a first collection of images is used to accelerate retraining of the deep learning model for a second class of images defined by the second collection.

13 Claims, 6 Drawing Sheets

(51) Int. Cl.
*G06V 10/26* (2022.01)
*G06V 10/40* (2022.01)
*G06V 10/82* (2022.01)
*G06V 20/70* (2022.01)

(52) U.S. Cl.
CPC .............. *G06V 10/40* (2022.01); *G06V 20/70* (2022.01); *G06V 10/82* (2022.01); *G06V 2201/03* (2022.01)

(56) References Cited

U.S. PATENT DOCUMENTS 10,762,629 B1 9/2020 Burton, II
10,878,219 B2 12/2020 Zhou et al.
11,062,459 B2 7/2021 Lu
11,216,752 B1 1/2022 Welsh et al.
11,263,497 B2 3/2022 Peng
11,270,227 B2 3/2022 Veshchikov et al.
11,481,682 B2 10/2022 Pfitzmann et al.
11,494,692 B1 11/2022 Watkins et al.
11,494,703 B2 11/2022 Xiang
2011/0320767 A1 12/2011 Eren et al.
2015/0231417 A1* 8/2015 Metcalf .................... A61N 7/02 601/3
2016/0078361 A1 3/2016 Brueckner et al.
2016/0358099 A1 12/2016 Sturlaugson et al.
2017/0333604 A1* 11/2017 Cohn ...................... A61L 27/18
2018/0089592 A1 3/2018 Zeiler et al.
2019/0236482 A1 8/2019 Desjardins et al.
2020/0019882 A1 1/2020 Garg et al.
2021/0019665 A1 1/2021 Gur et al.
2021/0081837 A1 3/2021 Polleri et al.
2021/0110605 A1* 4/2021 Haslam ..................... G06T 7/11
2021/0117977 A1 4/2021 Kim et al.
2021/0390455 A1 12/2021 Schierz et al.
2022/0020213 A1* 1/2022 Haslam .................. B33Y 50/00
2022/0237410 A1* 7/2022 Wrenninge ............ G06V 20/56
2022/0265233 A1* 8/2022 Boddington .............. G06T 7/30
2022/0313077 A1* 10/2022 Singh ....................... A61B 3/14
2023/0116417 A1* 4/2023 Taccari ................. G06F 18/214 706/15
2023/0315885 A1* 10/2023 Singh .................. G06F 21/6218 726/27
2024/0144473 A1* 5/2024 Razavi .................. G06T 7/0012
2025/0095864 A1* 3/2025 Hanratty ................ G06V 10/26

OTHER PUBLICATIONS

Artificial Intelligence and Machine Learning (AI/ML)-Enabled Medical Devices, Federal Drug Administration, Update: Oct. 19, 2023, 6 pagesArtificial Intelligence and Machine Learning (AI/ML)-Enabled Medical Devices | FDA.
Kim et al, Transfer learning for medical image classification: a literature review, BMC Medical Imaging, 22:69, 2022, 13 pages Transfer learning for medical image classification: a literature review.
Karimi et al, Transfer Learning in Medical Image Segmentation: New Insights from Analysis of the Dynamics of Model Parameters and Learned Representations, Artif Intell Med. Jun. 2021, 116, 42 pages Transfer Learning in Medical Image Segmentation: New Insights from Analysis of the Dynamics of Model Parameters and Learned Representations.
Karri et al, Transfer learning based classification of optical coherence tomography images with diabetic macular edema and dry age-related macular degeneration, Biomedical Optics Express, 8:2 Feb. 2017, 14 pages vol. 8, No. 2 | Feb. 1, 2017 | Biomedical Optics Express 579 Transfer learning based classification of optical coherence tomography images with diabetic macular edema and dry age-related macular degeneration S. P. K. Karri,1,* Debjani Chakraborty,2 and Jyotirmoy Chatterjee1 1School of Medical Science and Technology, IIT.
Matovinovic et al, Transfer Learning with U-Net type model for the Automatic Segmentation of Three Retinal Layers in Optical Coherence Tomography Images, 11th International Symposium on Image and Signal Processing and Analysis, Dubrovnik, Croatia, 2019, pp. 49-53. Transfer Learning with U-Net type model for Automatic Segmentation of Three Retinal Layers In Optical Coherence Tomography Images.

* cited by examiner

MODULAR MACHINE LEARNING SYSTEMS, DATABASES, METHODS, AND COMPUTER PROGRAM PRODUCTS FOR DEVELOPING AND DEPLOYING AUTOMATED IMAGE SEGMENTATION PROGRAMS

CLAIM OF PRIORITY

The present application claims the benefit of and priority to U.S. Provisional Application No. 63/495,598, filed on Apr. 12, 2023, entitled Modular Machine Learning Systems, Databases and Methods, and Computer Program Products For Developing and Deploying Automated Image Segmentation Programs, the content of which is hereby incorporated herein by reference as if set forth in its entirety.

BACKGROUND

Machine learning is an important tool in the analysis of medical images. Regulatory bodies have developed pathways for the approval of machine learning embedded within imaging systems and incorporated in Software-as-a-Medical Device. Machine learning is also important in medical devices and drug development. Structural and functional biomarkers are a critical component of drug development and machine learning techniques are important for discovering biomarkers and validating biomarkers as surrogate endpoints in clinical trials. Building machine learning models that pass regulatory inspection is notoriously difficult even as the opportunities and demand for imaging biomarkers and artificial intelligence clinical decision support systems is rapidly expanding. Successful development, validation, and clinical deployment of imaging biomarkers requires vast amounts of images supported by accurate clinical annotations. Training and validation of machine learning algorithms must be fully traceable, repeatable, and reproducible under real-world data conditions. This gets complicated in a multi-vendor, multi-modal, multi-site environment that lacks unified standards on imaging systems, metadata, and observational records.

A successful machine learning platform that addresses the needs of clinical diagnostics and imaging biomarker development will be quite different from systems designed for pure research applications. A machine learning platform that supports efficient translation of image processing algorithms requires three characteristics: 1) extensibility, 2) modularity, and 3) traceability. For efficient development of automated medical image analyses, a machine learning environment should be rapidly configurable for new classes of subject, illness, pathophysiology, and imaging devices. Machine learning architects should be modular, allowing maximum reuse of modules, rapid retraining, and simple deployment based on inputs and target outputs. In regulated medical environments, traceability across the entire classification, training, and validation cycle is a requirement. Additionally, protection of human health information is required; images and metadata must be anonymized.

A successful medical machine learning platform will accelerate the development and deployment of image processing algorithms across a complex landscape of subjects, diseases, devices, and therapies, and accelerate the approval of new diagnostics, biomarkers, and clinical endpoints by international regulatory bodies.

SUMMARY

Some embodiments of the present inventive concept provide a system for training and deployment of automated image segmentation algorithms. The system includes a database; one or more user interfaces for curating collections of images and annotating images that are stored in the database; a structured library of annotations that form a dictionary for defining features within an image; a means for training a deep learning model according to a set of annotations applied to a collection of images; a means for deploying a plurality of deep learning models from the set of applied annotations, the plurality of deep learning models including a nested set of annotations such that a first model segments a first set of features within the image and a second model segments the first set of features of the first model and at least one additional feature of the image; and a means for transfer learning, wherein at least one of the plurality of deep learning models deployed for a first collection of images is used to accelerate retraining of the deep learning model for a second class of images defined by the second collection.

Related methods and computer program products are provided.

DETAILED DESCRIPTION OF EMBODIMENTS

Figure 1:
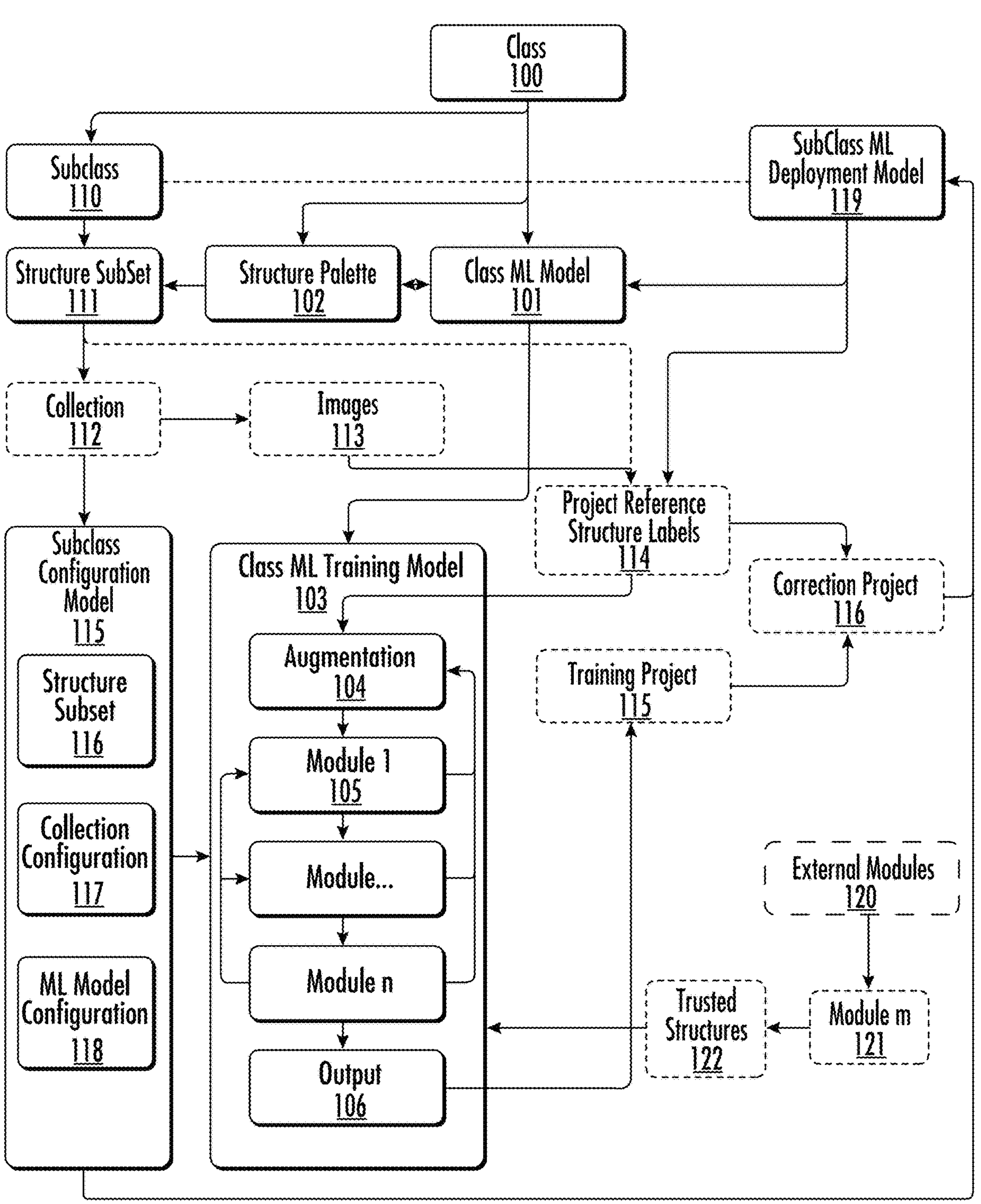
FIG. 1 is a flow chart illustrating the modular architecture in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk, C++, MATLAB or Python. However, the computer program code for carrying out operations of the present inventive concept may also be written in conventional procedural programming languages, such as the "C" programming language or in a visually oriented programming environment, such as VisualBasic or JavaFx.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer, a graphics processing unit, or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

As discussed in the background of the present inventive concept, the management of medical images and data in the context of research and clinical trials is notoriously difficult even as the opportunities and demand for imaging biomarkers and artificial intelligence clinical decision support systems is rapidly expanding. Meeting the demands of image-driven innovation and clinical care in the era of big data and Artificial Intelligence (AI) generally requires a comprehensive ontology that covers the medical imaging domain from hardware definition to observation records, from subject to image, from anatomy to disease. The ontology must be supported by methods to store records and images, move images and data from devices to storage to application, methods to rapidly curate, visualize, and annotate images, trace the provenance of images and data through algorithm development and validation, maximize the sharing of images and data over space and time, and protect the rights of access and use of individual patient data as required both ethically and legally. Accordingly, some embodiments of the present inventive concept provide an application programming Interface (API) and directory management system for organizing and managing data records in a database and objects in a data lake that provides ontology needed for big data and AI as will be discussed further herein.

As used herein, "ontology" refers to a set of concepts and categories in a subject area or domain that shows their properties and the relations between them. In the present inventive concept, the ontology refers to a hierarchical organization of entities that capture the data associated with a medical research program, clinical trial, or clinical evaluation, as diagrammed in, for example, FIG. 4. At the top level of the hierarchy, data entities are organized by a set of entities that define the circumstances under which data is managed, a set of entities that define the data itself. An appropriate ontology, including extension to algorithmic workflow traceability, is included by reference in, for example, U.S. patent application Ser. No. 16/839,475 entitled Methods, Systems and Computer Program Products for Retrospective Data Mining; U.S. patent application Ser. No. 17/142,560 entitled Methods, Systems and Computer Program Products for Classifying Image Data for Future Mining and Training; and U.S. patent application Ser. No. 17/870,317 entitled Methods, Systems and Computer Program Products for Handling Data Records Using an Application Programming Interface (API) and Directory Management System, the disclosures of which are hereby incorporated herein by reference as if set forth in their entirety.

A major challenge in the application of autonomous methods (i.e., artificial intelligence broadly, and machine learning more specifically) to medical imaging is the wide range of real-world conditions that must be accounted for. For clinical diagnosis and prognosis, specific diagnostic targets are indicated. Biomarkers for drug development may have another set of objections, and clinical endpoints for use in clinical trials yet another. Physiology is diverse in a healthy state. In a diseased state, pathology may be defined by an extensive library of variables, further characterized by anatomic location, and variable by stage of disease progression. Patients present an additional set of variables, including, sex, ethnicity, genotype, family history, socio-economic factors, and age. Additionally, imaging and functional test systems are not necessarily interoperable. Scaling, noise, distortion, and contrast may all be manufacturer dependent, and then also have dependencies on image acquisition protocol, patient cooperation, and other variables. The range of confounding variables is complex.

This complexity is reflected in regulatory hurdles. Regulatory bodies are likely to approve machine learning for narrow applications and range of devices. Evidence for such restrictiveness is found in the US Food and Drug Administration (FDA) list of cleared Software-as-Medical-Device (SaMD) products. As of October 2023, 649 SaMD products have been cleared by the FDA, of which 531 products serve radiology. Only 9 SaMD products have been cleared for ophthalmology, and 7 of these 9 products are Artificial Intelligence (AI)—enabled autonomous diagnostic products targeted at one disease—screening for diabetic retinopathy using color fundus photographs—and each indicated for use with one specific fundus photography device. While the hype of AI suggests that single large foundation models, or segment-anything models, there is no evidence that such models will pass regulatory scrutiny in the near term.

Given this range of complexity, software systems for training and deploying machine learning algorithms for medical applications must have at least two attributes: 1) they generally must offer traceability to the source and classifications of training data that then defines the range of applicability; and 2) they generally must be modular to allow rapid reuse and retraining to extend the range of applicability in a manner that confidence in results and pass regulatory scrutiny are increased. The present inventive concept defines a traceable modularity scheme for trainable and deployable machine learning algorithms that addresses these requirements.

While current models of MLOps (Machine learning model management—Azure Machine Learning|Microsoft Learn) are suggestive of certain classification and training tracking capabilities, they lack any specific architectural and implementation guidance of the present inventive concept. Such models are strictly hierarchical with the ability to pipe together mutually exclusive functions only.

The presentive inventive concept for medical image segmentation may be summarized as follows. 1) The range of intended applicability of an autonomous image segmentation algorithm is classified by a set of attributes that define the range of images to be segmented (a priori, or input classification). 2) The target set of features, structures, or segments to be identified is defined in a feature dictionary. 3) A modular machine learning algorithm, or network, is established to receive a set of input objects (e.g., images) that conform to the input classification, and trained to recognize features defined in the feature dictionary. 4) The segment classification set is further modularized in a manner that groups objects and segments according to rules appropriate to a broad class of similar applications. 5) The modular machine learning algorithm is modularized similarly to the segment classification, such that modules with the broadest range of applicability may be reused with the least amount of retraining. 6) The associated data model provides traceability to the supersets and subsets of the input classifications, the data used in any training activity, and the configurations of the machine learning program used in the training. Upon successful training of a segmentation algorithm to a class of input data, the resultant configurations are frozen for deployment.

Some embodiments of the present inventive concept provide a method of Transfer Learning (TL) applied to feature extraction. The literature on TL applied to medical imaging is broad. However, the TL approaches are generally targeted to apply broad deep learning models across different modalities, maximizing the reach of such base models.

A literature review of TL in medical image classification is presented in Transfer learning for medical image classification: a literature review by Kim (2022). As noted in Kim, TL involves a choice between freezing feature extraction models and fine-tuning models. In the first case, a convolutional neural network (CNN) developed for image segmentation in a first domain (e.g., MRI) is applied to a second domain (e.g., OCT), while perhaps changing the label definitions (dictionary) from the first to the second domain. In the second case, fine-tuning, the CNN architecture developed for the first domain is preserved, but the parameters are retrained for the second domain. Kim concluded that while fine-tuning from scratch is prevalent in the literature, it is computationally expensive. Kim recommends using the feature extractor method, and incrementally fine tuning the convolutional layers. It will be understood that that the "layers" of the convolutional network are the algorithm layers, and do not correspond to the features or an image, e.g., not the "layers" of a retina.

Kim concludes that there is no consensus for the optimum configuration for CNN fine-tuning, and that retraining from scratch achieves the highest level of diagnostic accuracy, likely because of the variety of data subjects and imaging modalities involved, and that TL with CNN models remains "interesting to investigate."

A second review of TL in medical image segmentation is presented in Transfer Learning in Medical Image Segmentation: New Insights from Analysis of the Dynamics of Model Parameters and Learned Representations by Karimi (2021). Karimi identifies the following applications of transfer learning: a) Transfer across acquisition protocols; b) Transfer across image modalities; c) Transfer across subject age; and d) transfer across segmentation tasks. The details of the transfer learning approaches in this review are sparse, but suggest that retraining the source models to the target data sets is more efficient than training from scratch.

An example of transfer learning-based classification OCT images with diabetic macular edema and dry age-related macular degeneration is provided in Transfer learning based classification of optical coherence tomography images with diabetic macular edema and dry age-related macular degeneration by Karri (2017). In this case Karri shows that models trained on non-medical images can be fine-tuned for classifying OCT images with target pathology An example of transfer learning with U-Net model for OCT retinal layer segmentation is presented in Transfer learning with U-Net type model for the automatic segmentation of three retinal layers in optical coherence tomography images by Matovinic (2019). The authors of this work applied a U-Net model pre-trained on a non-OCT dataset. Two models were trained and validated on OCT images of patients with age related macular degeneration: a first pre-trained model and a second model trained from scratch. The authors conclude that transfer learning was more effective than training from scratch, at least given the available data set, and suitable for segmenting three retinal layers bound by four surfaces. In accordance with embodiments of the present inventive concept, it will be understood that the authors state that "other layer boundaries cannot be unambiguously identified in the presence of age-related macular degeneration, so they are neglected in the terms of this study."

The following problems are left unaddressed in conventional methods: Given a base deep learning model (i.e. U-Net) for image segmentation that is conditioned for a specific medical application (i.e. ophthalmology), for a specific modality (i.e. OCT), for a specific imaging machine make and model (i.e. Zeiss Cirrus), and a specific class of patient or subject (i.e. healthy adult retina), to segment a specific set of features (i.e. inner and outer retinal layers), what is an optimal strategy for re-training to a new set of imaging, subject, and pathophysiologic circumstances? How can such transfer learning be conducted in a low- or no-code environment? How can such transfer learning be conducted in such a way that explainability and traceability are retrained to support regulatory approval and deployment in regulated environment?

Some embodiments of the present inventive concept address gaps in the conventional methods in the following ways: A base CNN model is developed that includes all the stages as normally applied to medical image segmentation generally, and ocular image segmentation specifically. The model architecture includes image pre-conditioning, image augmentation, and a CNN image decimation approach with encoder-decoder logic. An original model is trained using expert labelling of training images, the labels drawn from a feature dictionary registered to a database for traceability, and the expert annotations of training images recorded to the same or an associated database for traceability. The training data set is identified by a set of metadata that defines a class of image. The metadata may include information on the imaged subject (e.g., human or animal), anatomy (e.g., retina or cornea), the imaging device (e.g., make and model), and a state of the subject (e.g., healthy or diseased; if diseased, what disease and what level of disease progression). The feature set in the base training will be a subset of the potential of all features that may be of interest. The training images are registered as a collection in a database, and annotated (labelled) by experts in one or more projects registered to the collection.

The output of the trained and validated model is an executable segmentation program that may be applied to new images with no additional pre-conditioning or programmatic steps required of the user. The executable reads configuration information, model weights, and the like from a model file deployed with the executable. The model file is specific to the totality of parameters used in training. A new image that matches the training class may be expected to yield accurate segmentation results as described in the art. A new image of a different class may yield unsatisfactory results.

Some embodiments of the present inventive concept address a risk associated with processing new images outside of the training class without requiring new research, new code, or costly retraining exercises. In the initial training program, the features are organized into logical subsets. The subsets are chosen to maximize similarity of feature subsets across broad classes of images. For example, as has been recognized in the literature, identification of the retinal boundaries (inner retina, i.e., inner limiting membrane and outer retina, i.e., Bruch's membrane) will likely be more reproducible across classes of images than will the identification interior retinal surfaces. In some embodiments of the present inventive concept, the organization of feature subsets is managed in the database. In some embodiments, Palette Sets and Palette Subsets are a database constructs that contain the definitions of the feature libraries.

During initial training of the base model, the experts label images according to the Palettes, or feature library, without particular concern to transfer learning considerations. Rather, the training process accepts the annotations and runs multiple models on the same training set according to the feature subsets. This one-time processing cost yields significant benefits to future transfer learning activities.

In one example, a base 10-surface model for retinal surface segmentation is developed to identify 10 surfaces of a healthy retina: 1) inner limiting membrane (ILM); 2) Ganglion cell complex (GCC)-to-inner plexiform layer (IPL); 3) IPL-to-inner nuclear layer (INL); 4) INL to outer plexiform layer (OPL); 5) OPL-to-outer nuclear layer (ONL); 6) ONL-to-external limiting membrane (ELM); 7) ELM-to-inner ellipsoid zone (EZ Top); 8) EZ Top-to outer ellipsoid zone (EZ Bottom); 9) EZ Bottom-to-retinal pigment epithelium (RPE); 10) RPE-to-Bruch's Membrane (BM). At the same time, training restricted to the training of the various features subsets is rerun.

In some embodiments of the present inventive concept, four models, defined by reference to the surface numbers above, are trained: a) 2S {1, 10}; b) 4S {1, 3, 7, 10}; c) 7S {1, 3, 4, 5, 7, 9, 10}; d) 10S {1-10}. To demonstrate the direction of this approach, the following four models are trained: a) 2S {1, 10}; b) 4S {2S+{3, 7}}; c) 7S {4S+{4, 5, 9}}; d) 10S (7S+{2, 6, 8}}. 2S will be more generally applicable to a new class of images than 4S. 4S will be more generally applicable than 7S, and 7S will be more generally applicable than 10S.

The choice of models presented above is based on experience with contrast and visibility of retinal structures, but other model sets may be trained with the same strategy without departing from the scope of the present inventive concept. In fact, one model per surface could be deployed. The labelling process does not change, only the training and deployment of models change. The particular choice among these four models is one trade-off between utility and cost, but others are readily adapted.

The application of training and transfer learning processes in accordance with embodiments discussed herein includes the following elements: A) Feature and Object Class Definitions; B) Machine Learning Model Development; C) Base Model Training; D) Model Deployment; E) Transfer Learning; F) Model Extension Deployment.

Feature and Object Class Definitions: The feature and object (image) class definitions, as described above, are an important part of establishing an efficient, traceable, and maximally extensible transfer learning environment. In some embodiments of the present inventive concept, the features are defined an annotation library, organized into Palettes. The Palettes are further organized into sub-Palettes for organizing the parallel training models. The Palettes include feature names as well as labelling or annotation attributes. For image segmentation, a spline annotation type is a convenient construct for marking surfaces in an image. Embodiments of the present inventive concept are not limited to continuous surfaces. Closed boundaries, including ellipse, rectangle or polygon are also available. Similarly, multi-point annotations are useful for identifying sets of features, such as cells or hyper-reflective focii that one wishes to identify.

Machine Learning Model Development: Model development follows methods known in the art, including input image definition and regularization, image augmentation, and selection and engineering of the deep learning pipeline. In embodiments of the present inventive concept, a U-Net for OCT image segmentation has been adopted, but nothing in the inventive concept depends on this selection. What is required is a clear specification of the input image requirements and image regularization requirements for adaption to new images. Additionally, the output of the model is designed to provide results that can be imported into the system database.

Base Model Training: Initial training involves creating a collection of images that conforms to a base class definition, selection of a labelling Palette, and annotating the collection of images according to rules provided for the target segmentation. In some embodiments of the inventive concept, the collection of images is registered to a database with an appropriate set of metadata to define the class. The annotation is conducted within a project that is linked to the collection. Each annotation is drawn from the Palette, applied to the images, and stored in the database. Multiple annotators may annotate images from the same collection in independent projects.

After annotation, the annotations and images are exported, and segregated into training and validation sets. A third proportion of the annotated images is set aside for post-validation testing. The annotator is not responsible or aware of the separation of annotations into training, validation and test sets.

The annotated training set is fed into the training system and the resultant weights and hyperparameters of a successful training cycle are captured in the resultant model. In some embodiments of the inventive concept, a plurality of models are trained according to the target feature subsets, e.g., as defined by the Palettes. The models may be validated and tested using methods known in the art.

Model Deployment: The successfully trained model is compiled, and a configuration set is created for each specific model (e.g., 2S, 4S, 7S, 10S). In some embodiments of the present inventive concept, the deep learning model is deployed as an executable paired to the collection and annotation software program (ocuLink) that operates in conjunction with the database (ocuVault). A folder for each model parameter set is stored with the program. The program is aware of the presence of model folders, and the presence of available models is visible in the program's menu system. The user needs only to choose from available models in the menu system to process images using the trained segmentation algorithm.

Using ocuLink, the user curates a (new) collection of images that require segmentation. The collection is opened in a project in ocuLink, the user invokes a menu action to segment the images, and chooses the model from menu. OcuLink automatically exports the collection of images and feeds the deep learning program. The deep learning program reads the model folder to set the parameters, runs, and returns the segmentation results to ocuLink. The surface segmentations are written to the database, identified according to model, mapped to the original feature set (Palette) and collated in a sibling project to the exported collection. A second sibling project is automatically created to support visualization of the segmentation. In this second project, the point-by-point surface segmentation is downsampled to a set of easily visualized and modified keypoints. As an example, the full segmentation may have 1000 points per retinal surface. After downsampling, 20 to 50 points keypoints are presented per surface. This downsampled project may then be presented to a quantitative processing step (computing thicknesses for each surface) or may be manually corrected. If manual corrections are required for a significant proportion of images, this may be a sign that additional training is required. The manually corrected project may then be exported to retrain the existing class models, or to create a new class model. This is the start of the transfer learning process.

Transfer Learning: The process of transfer learning can now be seen to follow the prescription set above, while reducing the burden of expert annotation. A new collection of images is curated according to class of interest to the user. The user now has options for transfer learning.

If the new class of images is very closely related, for example same patients/subjects imaged with a different manufacturers imaging system or an imaging system operating at a different wavelength, or with a different imaging resolution, the user may run the segmentation using the base model, for example, 10S for complete surface segmentation. Upon inspection, the user finds that the segmentation needs correction. The user makes the corrections, and exports the collection for retraining as a new model class. Training runs as above, and a new set of models is created trained to this image class. The cost of training has been limited to correcting automatically generated annotations. No coding has been required.

A different retraining may be required based on a disease signature. In one example, degenerative retinal disease may change the nature of outer retinal surface structures. The user may choose to manually annotate outer retinal structures only, and rely on the original model, for example 4S, for segmenting the remaining structures. The visible outer retinal structure as defined in the Palette may differ from that originally defined. A new sub-Palette may be created to register the degenerated retinal structures. The collection of images is annotated with the new sub-Palette, call it DRS_1, and exported for training using transfer learning. The transfer learning process proceeds as follows: the layers 4S are automatically processed using the source model, and combined with the manually annotated set DRS_1, and a new model set for the degenerated image class is trained and deployed.

A more complex set of dystrophies may distort the internal renal layers, creating fluid volumes, or retinal separations (retinoschisis). The user may use a polygon annotation tools to identify the pathologies, and use the outer retinal segmentation, 2S, to define the retinal boundaries and compute total retinal thickness. The manual annotations are exported for training, and combined with automatic annotation using base model 2S to produce a new model class this this set of dystrophies. This logic may be extended to any new class of images.

Model Extension Deployment: Deployment of new models is the same as the original base model. All that is required is an additional construct to record the definition of the relevant object and feature classes. As these are drawn from metadata and palettes registered to the database, traceability is automatic.

The above descriptions define a specific implementation embodied in ocuLink software and the ocuVault database. More generally, in context with embodiments discussed herein, modularity is established to provide an iterative hierarchical approach to training and deployment. In the proposed solution every module can generate an independent solution from the raw input data. Results from earlier stages are used as guidelines, with a final step of label fusion. As an example, the hierarchy provides three related, but not identical objectives. The first step in the hierarchy is to identify an envelope for the target object, and provide subsequent steps to identify objects or segments substantially bound by the envelope. This may result in a multilevel hierarchic modularity, for example to identify the various ingredients of a turducken (chicken roasted inside a duck inside a turkey). The second step is to hierarchically identify objects or segments that are logically related and more readily identified given the presence of a previously identified object. For example, the turkey is identified, it may be easier to identify a roasting pan. The third step in the hierarchy is identifying specific structures that may be more circumstance dependent. In the present example, skin, bones or cartilage may be segmented, or the presence or volume of fat deposits in the duck. Furthermore, results of later stage steps may feedback to inform and refine early steps. The amount of iteration may be set until a quality objective is established for each module as well as for the overall result.

In some embodiments, anatomical tissue layers are segmented. In the eye, the cornea may be cornea, and the epithelium, stroma, and endothelium may be identified. The retina may also be segmented.

The retina is a complex multi-layered structure. From inner retina (towards the cornea) to outer retina, a series of physiological structures are identified as internal limiting membrane (ILM), nerve fiber layer (NFL), ganglion cell complex (GCC), inner plexiform layer (IPL), inner nuclear layer (INL), outer plexiform layer (OPL), outer nuclear layer (ONL), external limiting membrane (ELM). Naming conventions for the outer retinal structures, posterior to the ELM, include the ellipsoid zone (EZ), retinal pigment epithelium (RPE), and Bruchs Membrane (BM). Posterior to BM, the choriocapillaris, choroid, and sclera may be segmented. Depending on the specific imaging system attributes and subject under test, all or some of these layers may be visible, and additional layered structures not mentioned may be visible.

Additional topographical features are model dependent. Humans and non-human primates have a fovea and an optic nerve head. Rodents lack a fovea and have an optic nerve stalk. Rabbits, dogs, and cats lack a fovea and have their unique optic nerve structures. While the various subjects that are important in ophthalmic research applications and clinical care share much of retinal anatomy in common, differences are significant enough that one cannot expect a single autonomous segmentation algorithm to work universally across models.

Disease introduces new variants to the retina structure and presents important targets for autonomous segmentation and machine learning. Inflammation may affect various layers differentially. Neovascularization is a precursor to retinal vascular disease, and this may lead to edema in different layers of the retina. Other signs of degeneration include the formation of various deposits, including soft and hard drusen, or cellular apoptosis and atrophy. A glossary of features has been cataloged by Prof. Christine Curcio, University of Alabama, and is available at Annotation Glossary and References—Project MACULA.

A variety of imaging modalities manufactured by different vendors, representing different generations of technology may be the source of images. In retinal imaging, optical coherence tomography (OCT) is the dominant volumetric imaging modality. Layered features of the retina are visible in cross sectional OCT B-Scans. Average intensity projections, or summed voxel projections, are used to create OCT enface views of the retina orthogonal to the B-scans. By their nature, these are gray-scale images. By constraining the range of the depth over which voxels are summed, OCT enface images can provide views of the retinal topography of specific layers in the retina. An important application of automated segmentation of retinal layers from OCT B-Scans is to enable layer-specific enface projection images. OCT can also be used to provide detailed views of retinal vasculature in a technique known as OCT Angiography (OCTA).

Enface views of the retina may be created in several different ways. Color fundus photography provides a superficial view of the retina, and color elucidates important pathophysiological features. Multi-spectral color fundus photography is an emerging modality that uses more color channels to differentiate features. Short wavelength channels (blue) tend to show inner retina features, and long wavelength channels (red) highlight outer retinal features.

Scanning laser ophthalmoscopy (SLO) provides high contrast fundus images, and is useful for imaging fluorescent features. SLO images can be monochrome or multichannel for color. High-lateral resolution SLO, or without adaptive optics enhancement, can be used to directly visualize photoreceptors, or, tuned differently, nerve fibers or ganglion cells in the retina.

The wide breadth of imaging modalities provides multiple avenues for quantifying retinal features important to diagnosis and prognosis. This same variety of modalities and differences in implementation among manufactures make it challenging to develop autonomous analytics that can be widely adopted. Three machine language applications for autonomous analysis of retinal images have been approved for marketing by the US Food and Drug Administration. All three of them are used for the interpretation of one disease—diabetic retinopathy—using one modality—color fundus photography. And each clearance is specific to one company's machine learning algorithm on one manufacturer's color fundus camera. No machine learning algorithm has been cleared for use with OCT analysis.

The present inventive concept is designed to overcome many of the limitations of current strategies for training and deploying machine learning algorithms for retinal analysis. While embodiments of the present inventive concept focus on the retina, it is understood that the strategies are not limited to the retina or to ophthalmology, or to medical imaging.

In some embodiments of the present inventive concept, a single machine learning model, or network is deployed for a broad class of similar images. Similarity is established by the commonality of a classification library that defines a range of input images, and by the architecture of the network to classify the objects or segments from within the class of images according to a set of classification labels, or annotations. The OCT imaging of a retina provides a first example. As noted, the variety of subjects and differences in implementations of imaging systems challenges the universality of machine learning algorithms. All retinas in the class have similarities: an inner retinal surface and an outer retinal surface with a series of intermediate layers. The retina is formed of similar biological tissue forming similar biological function, with similar levels brightness and contrast among various layers.

In a first implementation of the inventive concept, a set of annotations are defined and labeled according the physiology of the retina. The annotation set, or palette, encompasses the range of surfaces in the broad class. Some surfaces may be missing from some members of the class. The palette is divided into subsets that support the modularity of the machine learning model. A first subset may specify an envelope for the retina, for example, specify the inner limiting membrane (ILM) and Bruch's membrane (BM). A second subset may specify surfaces between these two surfaces that generally present the brightest contrast, and therefore will be easiest to train. In the first example, this second subset includes the IPL-INL boundary, the INL-OPL boundary, and the inner edge of the EZ. A third subset may specify a set of surfaces that are somewhat riskier to identify, such as the GCC-IPL boundary, the OPL-ONL boundary, the ELM, the outer edge of the EZ, and the OS-RPE boundary.

In some embodiments of the present inventive concept, one machine learning code base is provided that can be used to train autonomous image segmentation on multiple differentiated sets of images without modifying the code. A broad set of images and segment structures that may be used with this single code base is the class. Subsets of images and structures form subclasses with substructures. The subsets and their structures are subclasses and substructures of the class if the master code base is used to train segmentation of the subset without modifying the underlying code base. Three types of configuration data provide no-code instruction to the machine learning master code base. The configurations define 1) the structures of the subclass to be segmented; 2) definitions of the subject and images that define the subclass and set input parameters to be read by the master code base; and 3) configurations that define run-time options of the master code base that are tailored to the subclass. Segmentation of a subclass is trained using collections of images and associated configuration data consistent with the subclass. After successful training, a deployment model is of the machine learning code includes the master code base and the associated subclass configuration settings.

Successful training is defined by satisfactory performance of the segmentation according to a set of metrics defined for the class. Test metrics are well known in the art. An example is to compare the average error of the machine-defined segments versus the expert annotations. One may set up any set of metrics deemed appropriate to the application.

Multiple subclasses may be trained on the same master code base with changes only to the configuration settings. The subclasses and associated configurations are registered in a database, such that autonomous segmentation is achieved from the same code base by reference to the subclass and its associated configurations.

In general, training is a manual process requiring experts to annotate training data drawn from the subclass. An iterative training process may be applied wherein an expert annotates a training set, trial configurations are applied to the master machine learning code base and returned for review. Experts may indicate corrections in a second annotation step, and the corrections are used to derive a quality metric and to modify the trial configuration. This process is repeated until a satisfactory result is achieved, at which time the configuration is validated with fresh data, and a deployment model of the code is locked.

A key advantage of the present inventive concept is that an existing deployment model of one subclass may be used to accelerate training of a second neighboring subclass with the same code base, and without requiring any modifications to code. The user modifies configuration files to define new subclass and the images for the new subclass. The user starts with the ML run-time options of the previously trained neighboring subclass, imports the segmentation into the annotation engine used in the original subclass training exercise, and then corrects the annotation. The expert-corrected annotations become the target for measuring success of the ML segmentation with subsequent modifications of the run-time options configuration set.

This training method dramatically accelerates training of the segmentation method on new subclasses, as cold expert-annotation is not required. Further, a set of run-time configurations may be preset and multiple training exercises may be run in parallel or sequentially with a pre-defined set of run-time configurations. The results may be tested and compared using the pre-defined metrics, or the results may be compared in a more manual process. This process may be repeated until the machine learning code metric converges with a given run-time configuration set to the target. Furthermore, this process may be automated with a script that iterates through run-time configuration options until the target metric is achieved.

Typically, a machine learning algorithm for image segmentation consists of a neural network that iteratively samples images blocks, applies filters across a sequence of layers, and tests pixels for membership to the class-labels, or structures as defined herein. As the number of layers increases, the complexity and computational costs increase. A single neural network is trained for all of the class-labels (structures) to be segmented in the image. The greater the number of class-labels (structures), the greater the complexity and computational cost, and the greater the risk that the network does not robustly converge on a unique and reproducible solution.

The flexibility of the machine learning code of the present inventive concept is based on its modular and hierarchical structure. The run-time options determine the subset of class-labels (structures) processed by each neural network module, the order of processing, and any iteration that is applied. In this way, the metric may be tested modularly as well. For example, a module trained to identify the inner limiting membrane (ILM) of retina may work without a configuration change across a broad set of subclasses of retina segmentation, while identifying the external limiting membrane (ELM) may be highly dependent on the subject, or the imaging device. Rather than seeking a general neural network solution that converges on all of the class-labels of the target segmentation for each subclass, the training stops for each module when the module meets the training objective. This reduces training time dramatically, as the training effort is focused on structures with greatest inter-subclass differentiation.

An example machine learning training and deployment model of the present inventive concept is illustrated in FIG. 1. The Class 100 is the superset that defines the scope and entities that comprise the inputs, operations, and outputs associated with the Class Machine Learning (ML) Model 101. The Structure Palette 102 is the complete library of class labels, i.e., structures, which are available as outputs of the Class ML Model 101. The SubClass 110 is subset of the Class 100 that is trainable in the Class ML Training Model 103. The subset of class labels appropriate to the SubClass 110 is the Structure Subset 111 drawn from the Structure Palette 102. Collections 120 are as a set of Images 121 that are representative of the SubClass 110. Definitions of the SubClass 110 required to define and train the ML Model 103 contained in the SubClass Configuration Model 115 include the Structure Subset (i.e., class labels) 116, the Collection Configuration 117, and the ML Model run-time Configuration 118. Interior to the Class ML Training Model 103 is the image augmentation model 104, and a set of machine learning modules 105, and the output module 106. Traceability is maintained as a sequence of Projects linked to Collections 112 of Images 113 that holds the records of images, processes, and results of specific steps in the training sequence. Reference Project 114 houses expert annotations of a Collection 112 of Images that provide reference to image structures that are representative of the class-labels of the Structure Subset 111. The annotated Collection flows from Project 114 to the Training Model 103. Output 103 is exported from the Training Model and imported into Training Project 115. This data is stored in a database model as defined in the referenced patent applications incorporated by reference above for traceability. It may be desirable to have an expert correct the Outputs 103. To facilitate corrections, Training Project 115 may be copied to Corrections Project 116 for review and modifications. When training is satisfactorily completed, the successful SubClass definitions, including the Subclass Configuration Model 115, are bound with the Class ML Model 101 and recorded as the SubClass ML Deployment Model 119.

Subsequent SubClasses may be defined and trained similarly without modifying the code base of Class ML Training Model 103. Training the ML segmentation code for adjacent subclasses may be accelerated by replacing cold manual expert annotation of a new Collection of Images with a pre-processing step using an existing SubClass ML Deployment Model. The expert then reviews the performance of the automated segmentation and make necessary corrections. This corrected pre-processed annotation set becomes an appropriate Reference Project 114 for the new SubClass 110. An important advantage of the current inventive process is that results can be judged on subsets of the subclass Structure Subset 111. Where the configurations of the pre-existing SubClass Configuration Model 115 yield satisfactory results on the new SubClass, this can be reflected in the ML run-time Model Configuration 118, thus maximizing reuse of successfully trained Modules 105 and minimizing training time for new SubClasses.

Similarly, this concept allows integration of external sourced Modules 120 that are verified to accurately segment specific trusted structures 122 of the class. This in turn increase or possibly maximizes the ability to share and deploy modules that have been proven in a particular context of the Class 100. It should also be noted that the Class ML Training Model 103 may always be augmented with additional augmentations 104, Modules 105, and Outputs 103 to extend the envelope of capability of the Class without impacting existing deployment models 119 or requiring retraining of existing SubClasses 110. An important use case for such augmentation is to add capabilities to segment for biomarkers of early disease. Particularly in early stage disease existing deployment models may work well on the healthy subject subclass, and the addition of modules to identify structures relevant to disease diagnosis or prognosis may be added as the science allows.

Figure 2:
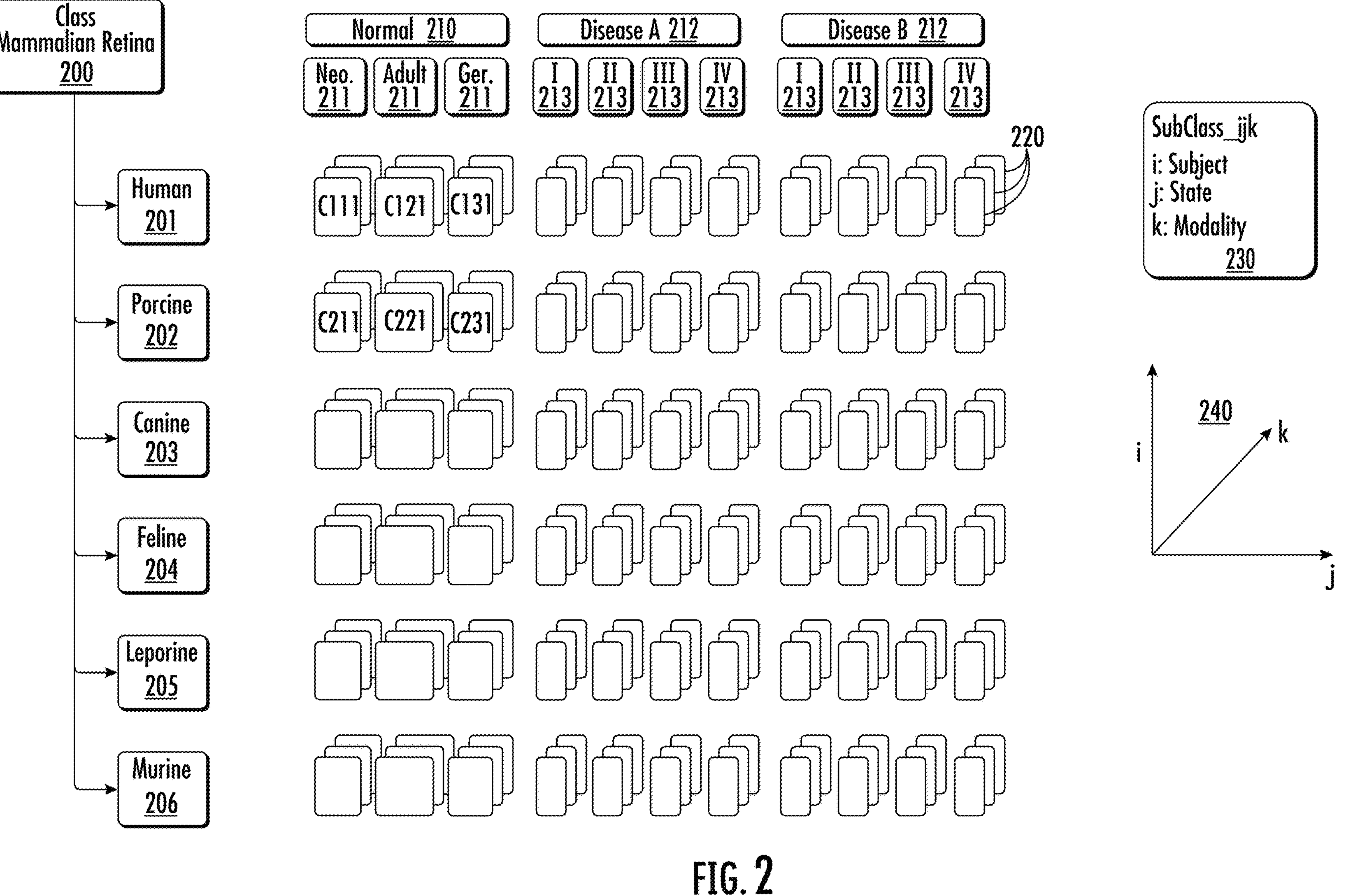
FIG. 2 is a diagram illustrating an exemplary classification architecture for image subclasses in accordance with some embodiments of the present inventive concept.

In real-world applications, the breadth of potential SubClasses 110 may be quite extensive. For example, FIG. 2 illustrates the Class 200 of Mammalian Retina. Diversity of retina in mammals is significant and variety of mammals play a role in research and drug development, and may also be the subject of veterinary clinical care. A non-exhaustive list of mammal models that are useful in clinic and research includes primate (human and non-human) 201, porcine (swine) 202, canine (dog) 203, feline (cat) 204, leporine (rabbit) 205, and murine (rodent). The retina and ocular optics are similar enough that one would hope to use similar tools of analysis, and different enough that a single ML deployment model is unlikely to be useful across the Class. Furthermore, the state of subject is variable. For example, in normal healthy subjects 210, the retina may vary by age 211. Different Diseases 212 and stage of disease 213 will all affect have different impact on the retina structure. Even within the classifications listed, different genotypes may yield phenotypes that are not amenable to segmentation with the same code configurations. Additionally, the image modality, manufacturer, and device model 220 all will have differences that impact image processing and analysis. A data management system that track configurations of the subject, imaging system, and code configurations is necessary to track and validate training and deployment models.

FIG. 2 diagrams a three-dimensional subclassification data architecture to manage training and deployment of segmentation models for variants within a class. The rows in FIG. 2 are subject classifications 200, the columns are subject state classifications 210, and the third implied dimension is the imaging system 220 that provides the images to be segmented. Each block SubClass_ijk 230 defines a unique configuration set that may yield unique deployment models. These classifications may be mapped as locations in 3D space 240. As described, these classifications are discrete positions on this map. It will be understood that configurations may map to a higher dimensional space (consider, for example, sex and ethnicity), and some classification variables may be continuous rather than discrete (consider, for example, age). Such over-specification of the classifications is not ideal.

Consider instead bundling individual subclasses into broader inclusive subclasses. Since traceable records of SubClasses are created, associated ML training and deployment models, and the data used in training via Collections, this information may be recalled and the configurations may be optimized into a broader deployment model over time. For example, cats and dogs may be initially treated as distinct subclasses. Cats and dogs have tapetum, a reflective layer in the outer retina. Their retina is different from humans. It may be determined that cats and dogs are similar enough to group in a single subclass, for example, mammals with tapetum. Initially images acquired by two different manufacturers of optical coherence tomography imaging systems may initially be separated into different SubClasses, and subsequently combine them into a single subclass. Maintaining maximum separability initially may accelerate training, and also support traceability required by regulatory bodies. The more subclasses can be combined over time, the more efficient the use of machine learning deployments in real-world applications.

Figure 3:
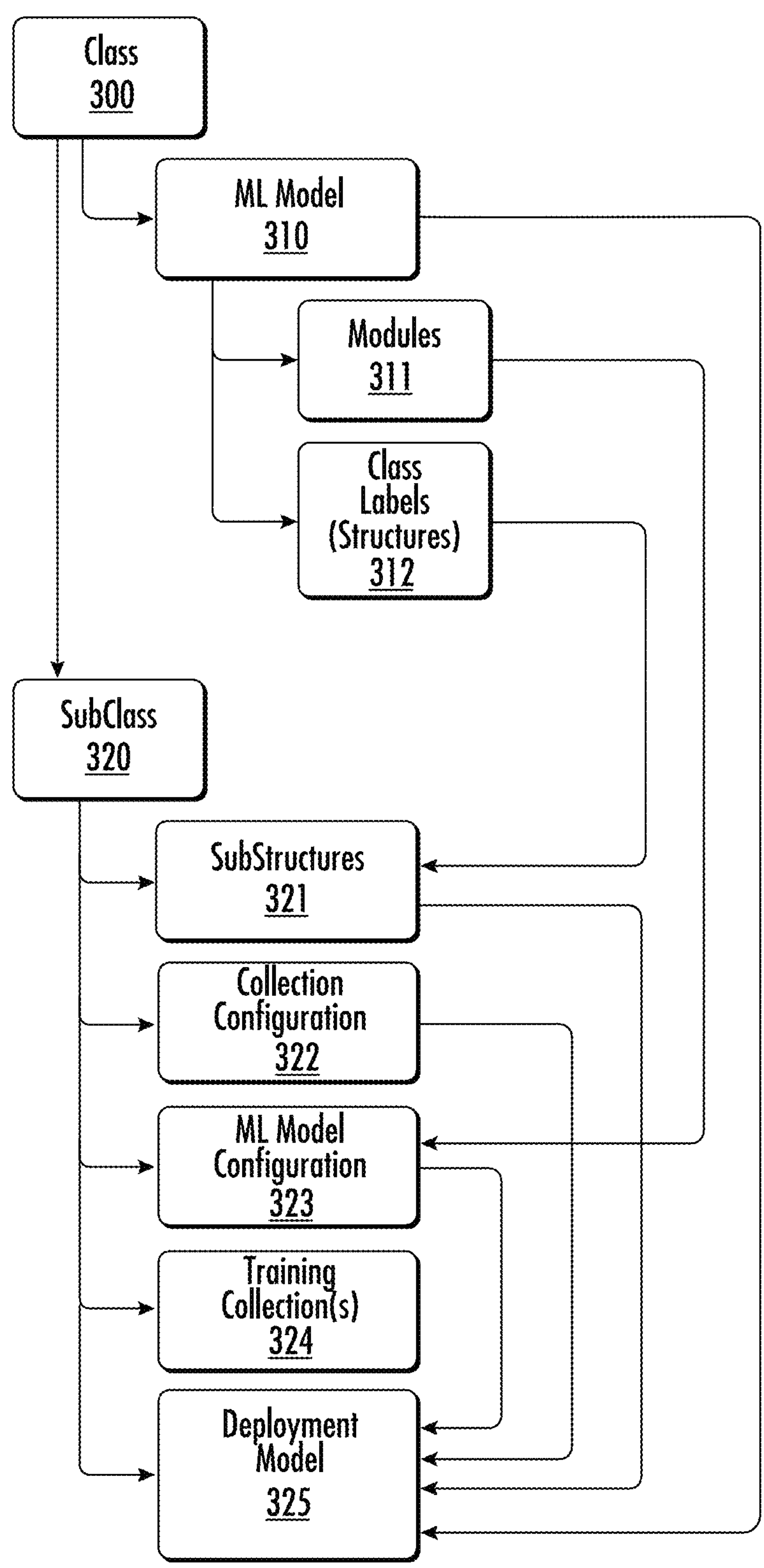
FIG. 3 is a block diagram illustrating a relational architecture between a machine learning class and its subclasses according to some embodiments of the present inventive concept.

A high-level model for the data structure for storing and tracing Class and SubClasses is shown in FIG. 3, following the flow chart of FIG. 1. Class 300 comprises ML Model 310 and SubClass(es) 320. ML Model 310 comprises a set of machine learning Modules 311 that support segmentation of a set class labels (Structures) 312. Each SubClass 320 is trained to segment a subset of Structures 321 by feeding a set of configurations that define the SubStructures 321, the input images 322, and the ML run-time configurations 323. Trainings sets are organized by collections 324, and successful training yields a ML deployment model 325. Each block in this diagram represents elements in a relational database that supports this inventive concept.

Figure 4:
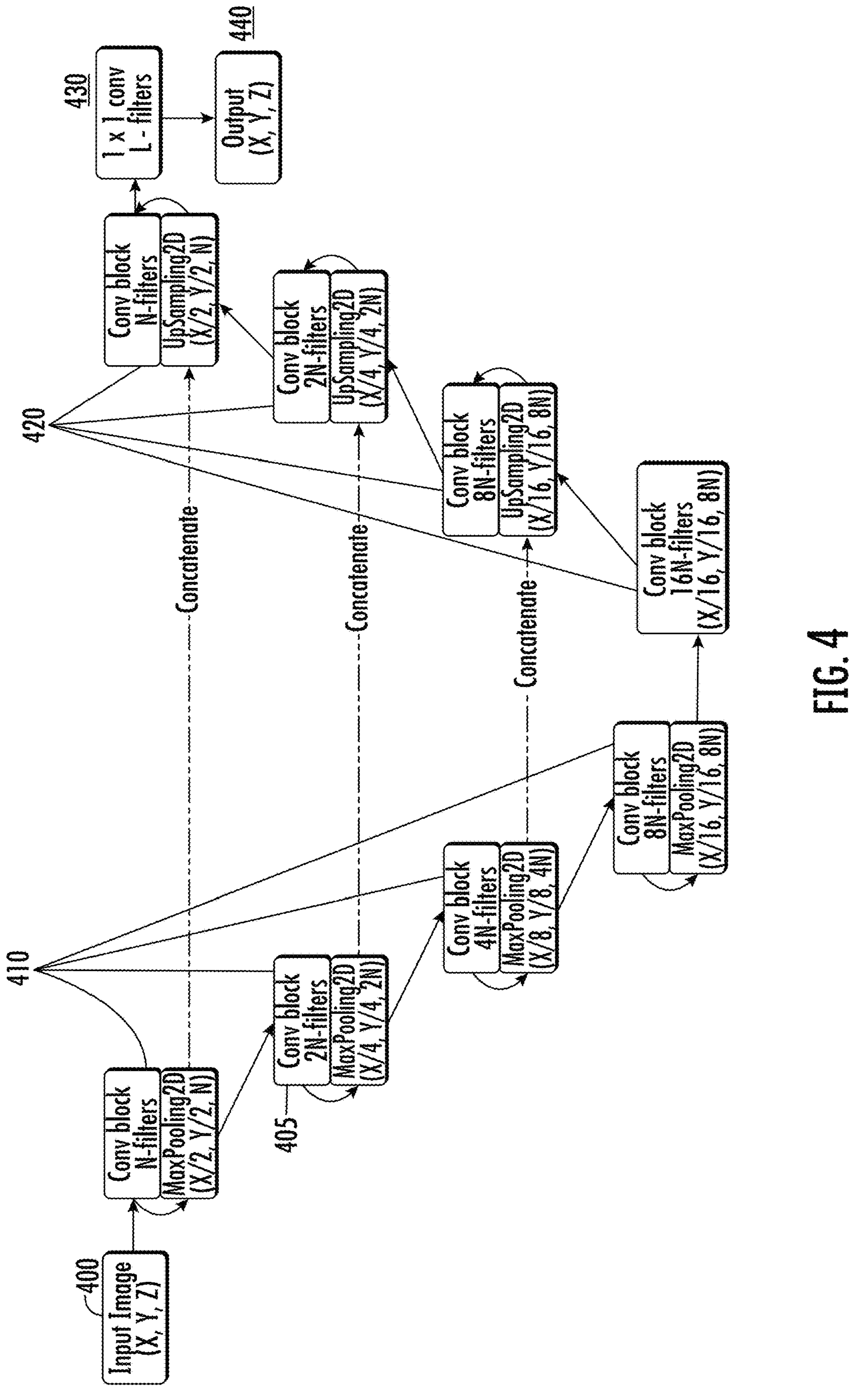
FIG. 4 is a block diagram illustrating a U_Net module in the context of some embodiments of the present inventive concept.

In some embodiments of the present inventive concept, each Module 311 is itself a convolutional neural network (CNN), as shown in FIG. 4. In FIG. 4, a particular implementation of a U-Net is diagramed that an implementation of the present inventive concept has been applied. The Input Image 400 is processed through convolutional blocks in a sequence of down-sampling and filtering layers 410, and then the process progresses though a symmetric series of up-sampling layers 420. A final filter 430 recovers L of the SubStructures of the SubClass, where L represents the subset of substructures defined for the particular module. The configurations that control the structures, the input images, and the configurations of the one or more modules are as defined in FIG. 1 (and FIG. 3): Structure Subset 116 (321), Collection Configuration 117 (322), and ML Model Configuration 118 (323).

Figure 5:
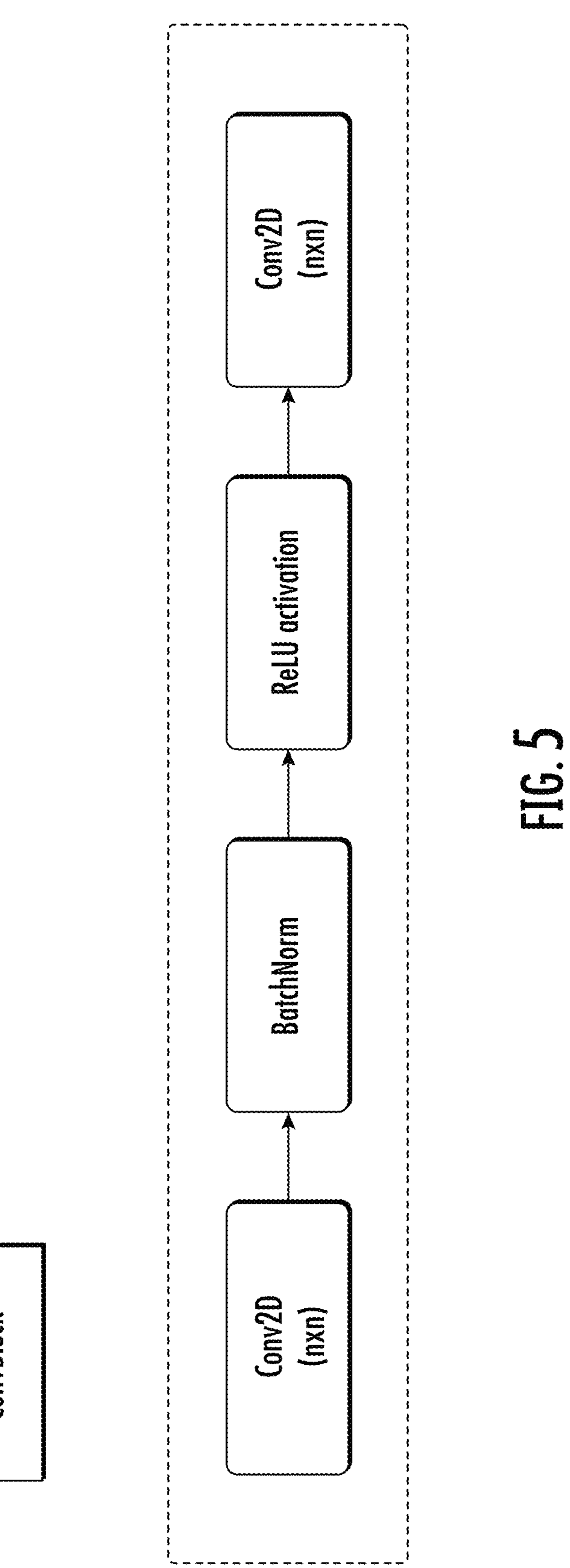
FIG. 5 is an illustration of the sequential computations of a convolutional block (ConvBlock) in the context of some embodiments of the present inventive concept.

In the U-Net architecture, the steps in each convolutional block 405 of each layer of each module may be as diagrammed in FIG. 5. ConvBlock 500 in FIG. 5 diagrams an initial (n×n) 2D convolution 501, followed by a batch normalization 502, and a rectified linear unit 503 that performs the activation function. The block closes with an (n×n) 2D convolution 505. The 2D convolution kernel size balances specificity (small kernel) and sensitivity. A starting point is a 3×3 pixel kernel.

Figure 6:
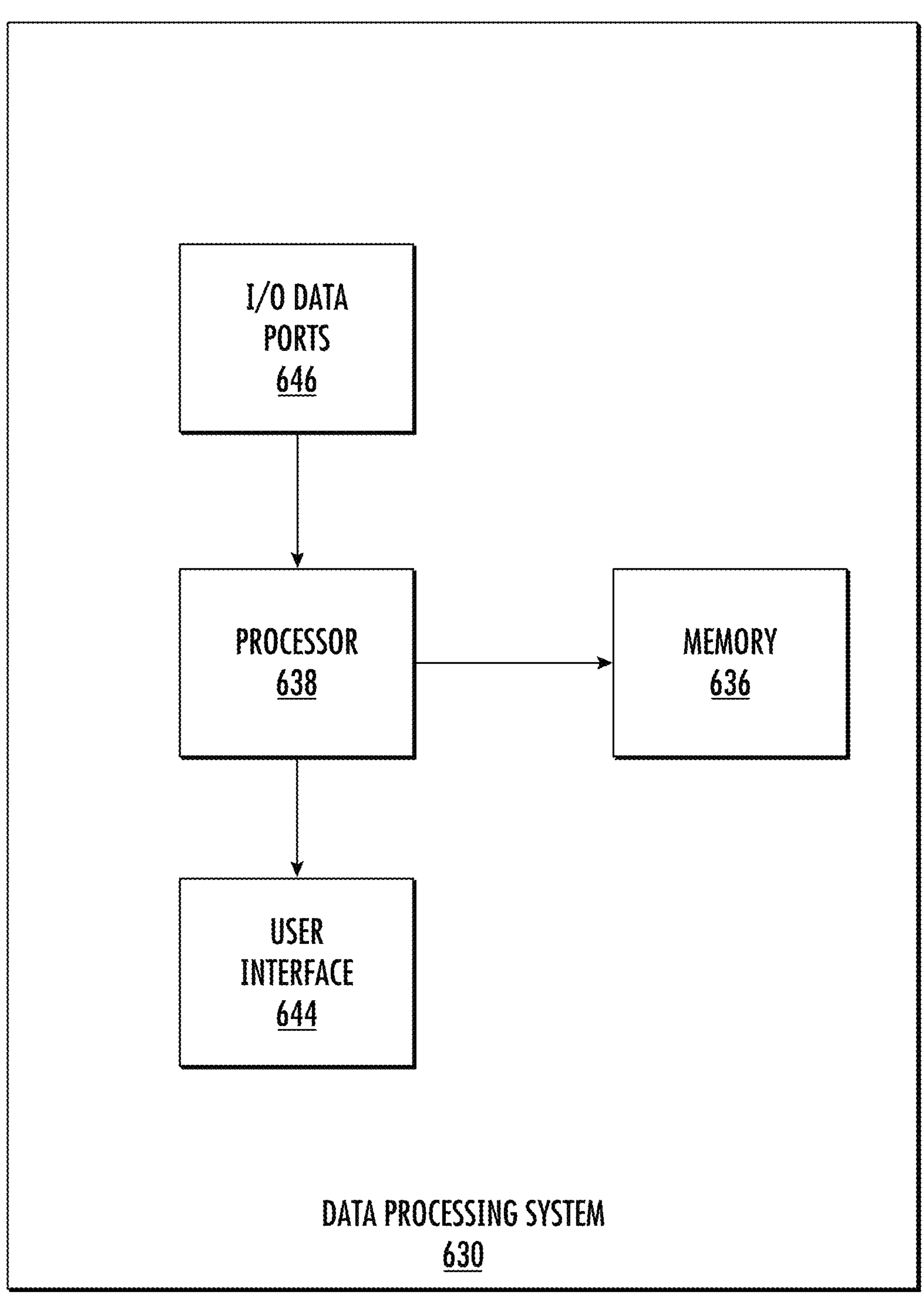
FIG. 6 is a block diagram of a data processor in accordance with some embodiments of the present inventive concept.

As is clear from the embodiments discussed above, some aspects of the present inventive concept may be implemented by a data processing system. The data processing system may be included at any module of the system without departing from the scope of the present inventive concept. Exemplary embodiments of a data processing system 630 configured in accordance with embodiments of the present inventive concept will be discussed with respect to FIG. 6. The data processing system 630 may include a user interface 644, including, for example, input device(s) such as a keyboard or keypad, a display, a speaker and/or microphone, and a memory 636 that communicate with a processor 638. The data processing system 630 may further include I/O data port(s) 646 that also communicates with the processor 638. The I/O data ports 646 can be used to transfer information between the data processing system 630 and another computer system or a network using, for example, an Internet Protocol (IP) connection. These components may be conventional components such as those used in many conventional data processing systems, which may be configured to operate as described herein.

In the specification, there have been disclosed embodiments of the inventive concept and, although specific terms are used, they are used in a generic and descriptive sense only and not for purposes of limitation. The following claim is provided to ensure that the present application meets all statutory requirements as a priority application in all jurisdictions and shall be construed as setting forth the scope of the present inventive concept.

That which is claimed is:

1. A system for training and deployment of automated image segmentation algorithms, the system comprising:

a database;

one or more user interfaces for curating collections of images and annotating images that are stored in the database;

a structured library of annotations that form a dictionary for defining features within an image;

a means for training a machine learning model according to a set of annotations applied to a collection of images;

a means for deploying a plurality of machine learning models from the set of applied annotations, the plurality of machine learning models including a nested set of annotations such that a first model segments a first set of features within the image and a second model segments the first set of features of the first model and at least one additional feature of the image; and a means for transfer learning, wherein at least one of the plurality of machine learning models deployed for a first collection of images is used to accelerate retraining of the machine learning model for a second class of images defined by the second collection, wherein the curated collection of images forms a class;

wherein the database includes metadata defining the class;

wherein the metadata defining the class comprises at least one of an imaging modality, a subject attribute, and a state of a subject; and wherein a set of features relevant to an image class forms a feature subclass, the feature subclass is mapped to a library of annotations, and the relationships between annotations, feature subclass, and image class retain traceability during model training, validation, and deployment.

2. The system of claim 1:

wherein a first class of images is adjacent to a second class of images when the first and second class of images share at least a common imaging modality, subject attribute, or pathophysiological state of subject and share at least one common feature subclass; and wherein the transfer learning includes segmenting images of a second class with a first machine learning model trained on a feature subclass of an adjacent first class of images, correcting the set of segmentations on this second image class, and using the corrected segmentations to train a second machine learning model for this second class of images.

3. The system of claim 2, wherein the machine learning model is a convolutional neural network (CNN) implementing a U-Net architecture for segmentation of anatomical or pathological features.

4. The system of claim 1, wherein the system comprises a library of machine learning models associated to classes of images and subclasses of features.

5. A method for training and deployment of automated image segmentation algorithms, the method comprising:

curating collections of images and annotating images stored in a database using one or more user interfaces;

providing a structured library of annotations that form a dictionary for defining features within an image;

training a machine learning model according to a set of annotations applied to a collection of images;

deploying a plurality of machine learning models from the set of applied annotations, the plurality of machine learning models including a nested set of annotations such that a first model segments a first set of features within the image and a second model segments the first set of features of the first model and at least one additional feature of the image;

transfer learning, wherein at least one of the plurality of machine learning models deployed for a first collection of images is used to accelerate retraining of the machine learning model for a second class of images defined by the second collection;

organizing the images into collections according to classes with a defined ontology that includes at least one of an imaging modality, a subject attribute, and a state of a subject;

exporting annotated training datasets into automatically segregated training, validation, and post-validation testing sets;

conducting training of a machine learning models on a class of images and subclass of features; and associating trained machine learning models with the class of images and the subclass of features, and storing the trained machine learning models in an accessible library.

6. The method of claim 5, wherein transfer learning comprises:

selecting a first machine learning model trained on a set of features annotated on a first class of images from a library of available machine learning models;

performing segmentation on the same set of features on a second class of images with the first machine learning model;

correcting the segmentations of the second collection of images; and training a second machine learning model for the second collection of images, associating the trained machine learning model with the second class of images, and storing the second machine learning model in the library of models.

7. A computer program product for training and deployment of automated image segmentation algorithms, the computer program product comprising:

a non-transitory computer readable storage medium having computer readable program code embodied in said medium, the computer readable program code comprising:

computer readable program code to curate collections of images and annotating images stored in a database using one or more user interfaces;

computer readable program code to provide a structured library of annotations that form a dictionary for defining features within an image;

computer readable program code to train a machine learning model according to a set of annotations applied to a collection of images;

computer readable program code to deploy a plurality of machine learning models from the set of applied annotations, the plurality of machine learning models including a nested set of annotations such that a first model segments a first set of features within the image and a second model segments the first set of features of the first model and at least one additional feature of the image;

computer readable program code to transfer learn, wherein at least one of the plurality of machine learning models deployed for a first collection of images is used to accelerate retraining of the machine learning model for a second class of images defined by the second collection; and computer readable program code that includes a routine to associate one or more images to be segmented with a class of images based on image metadata and class definitions in a database, wherein the computer readable program code includes a routine to dynamically present machine learning model from a library of available models to a user based on the availability of pretrained models in a library of models.

8. The computer program product of claim 7, wherein the computer readable program code includes a display of model options and one or more classes of images and subclasses of features for which the models have been trained.

9. The computer program product of claim 7, wherein the computer readable program code evaluates image metadata and recommends a machine learning model that has been trained on the class of image or an adjacent class of image.

10. The computer program product of claim 7, wherein the computer readable program code:

selects or allows the user to select a machine learning model for segmenting the one or more images;

invokes the machine learning model to segment the images, generates a project record to store segmentation results; and provides a visualization interface for a user to visualize of the image and the image segmentation results.

11. The computer program product of claim 10, wherein the visualization interface includes a segmentation correction module, wherein a user can correct images segmented by a first machine learning model, and export corrected segmentation data for training of a second machine learning model, train a second machine learning model, and store the second machine learning model in the model library.

12. The computer program product of claim 11, wherein the training module automatically adjusts run-time configurations for a series of training experiments and selects the optimal configuration based on pre-defined evaluation metrics.

13. The computer program product of claim 7, wherein the computer readable program code is modular and allows extension to multiple imaging domains including ophthalmic, neurological, and oncological images using class-specific configurations.

* * * * *